(12) United States Patent
Gupta

(10) Patent No.: US 11,259,342 B2
(45) Date of Patent: Feb. 22, 2022

(54) ENABLING SUPPORT FOR RELIABLE DATA SERVICE AND PS DATA OFF

(71) Applicant: Intel Corporation, Santa Clara, CA (US)

(72) Inventor: Vivek G. Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/645,403

(22) PCT Filed: Nov. 20, 2018

(86) PCT No.: PCT/US2018/061930
§ 371 (c)(1),
(2) Date: Mar. 6, 2020

(87) PCT Pub. No.: WO2019/100043
PCT Pub. Date: May 23, 2019

(65) Prior Publication Data
US 2020/0288515 A1 Sep. 10, 2020

Related U.S. Application Data

(60) Provisional application No. 62/588,688, filed on Nov. 20, 2017.

(51) Int. Cl.
*H04W 76/12* (2018.01)
*H04W 76/22* (2018.01)
(Continued)

(52) U.S. Cl.
CPC .......... *H04W 76/12* (2018.02); *H04W 48/02* (2013.01); *H04W 48/18* (2013.01); *H04W 76/22* (2018.02); *H04W 88/16* (2013.01)

(58) Field of Classification Search
None
See application file for complete search history.

(56) References Cited

U.S. PATENT DOCUMENTS

2012/0082095 A1 4/2012 Sun
2018/0199395 A1* 7/2018 Huang-Fu ........... H04L 65/1066
(Continued)

FOREIGN PATENT DOCUMENTS

CN 111165012 A 5/2020
WO WO-2019100043 A1 5/2019

OTHER PUBLICATIONS

"International Application Serial No. PCT/US2018/061930, International Preliminary Report on Patentability dated Jun. 4, 2020", 8 pgs.

(Continued)

*Primary Examiner* — German Viana Di Prisco
(74) *Attorney, Agent, or Firm* — Schwegman Lundberg & Woessner, P.A.

(57) ABSTRACT

Systems and methods of signaling RDS and PS Data Off in a UE and to a network are described. A UE includes TE and a MT. The TE determines whether RDS and PSDO are to be used for a PDN connection, and generates an AT command for communication to the MT to indicate an RDS status and a PSDO status of the PDN connection. The MT indicates to the network, based on the AT command, the RDS status and PSDO status of the PDN connection at the ME. The AT command enables the TE and allows the ME to communicate support for, and the status of RDS and PSDO, to the MT and enables usage, testing and status reporting of the features.

20 Claims, 9 Drawing Sheets

(51) Int. Cl.
*H04W 48/02* (2009.01)
*H04W 48/18* (2009.01)
*H04W 88/16* (2009.01)

(56) References Cited

U.S. PATENT DOCUMENTS

| | | | | |
|---|---|---|---|---|
| 2019/0190775 | A1* | 6/2019 | Buckley | H04L 67/28 |
| 2019/0289646 | A1* | 9/2019 | Kim | H04W 76/10 |
| 2019/0313276 | A1* | 10/2019 | Huang-Fu | H04W 28/0273 |
| 2019/0357090 | A1* | 11/2019 | Drevon | H04W 4/24 |

OTHER PUBLICATIONS

"3GPP: TSG CT: Mobile radio interface Layer 3 specification; Core network protocols; Stage 3 (Release 15)", 3GPP Ts 24.008 V15.0.40, [Online] Retrieved from the internet: <https://portal.3gpp.org/desktopmdlSecications/SpecificationDetails.aspx?specificationId=1015>, (Sep. 22, 2017).

"3GPP; TSG CT; AT command set for User Equipment (UE)(Release 14)", 3GPP TS 27.007 V14.5.0, [Online] Retrieved from the internet: <https://portal.3gpp.org/desktopmodules/Specifications/SpecificationDetails.aspx?specificationId=1515>, (Sep. 20, 2017).

"International Application Serial No. PCT/US2018/061930, International Search Report dated Mar. 8, 2019", 4 pgs.

"International Application Serial No. PCT/US2018/061930, Written Opinion dated Mar. 8, 2019", 6 pgs.

Ericsson, "Preparation for the 5G access", CI-174683, 3GPP TSG-CT WG1 Meeting #107, Reno (USA), [Online] Retrieved from the internet: <http://www.3gpp.org/ftp/1sg_ct/WGI_mm-cc-sm_ex-CNI/TSGCI_107_Reno/docs/>, (Nov. 18, 2017).

Intel, "Update to +CGDCONT and +CGCONTRDP for Reliable Data Service", C1-174555, 3GPP TSG-CT WG1 Meeting #106, Kochi (India), [Online] Retrieved from the internet: <http://www.3gpp.org/ftp/tsg_ct/WGI_mm-cc-sm_ex-CNI/TSGCI_106_Kochi/docs>, (Oct. 27, 2017).

"European Application Serial No. 18879506.6, Extended European Search Report dated Jul. 12, 2021", 14 pgs.

"Indian Application Serial No. 202047010244, First Examination Report dated Jul. 5, 2021", 5 pgs.

"Study on 3GPP PS Data Off (Release 14)", 3GPP TR 23.702 V14.0.0, (Dec. 1, 2016).

Intel, et al., "Support for PS Data Off in AT Commands", 3GPP Draft' 27007 CR0538R2 (REL-15) C1-181298, 3rd Generation Partnership Project (3GPP), Mobile Competence Centre ; 650, Route Des Lucioles ; F-06921 Sophia-Anti Polis Cedex ; France vol. Ct WG1, No. Montreal (Canada), Retrieved from the Internet: <URL:http ://www.3gpp.org/ftp/tsg%5Fct/TSG%5FCT/TSGC%5F79%5FChennai/Docs/CP%2D180089%2Ezip>[retrieved on Mar. 12, 2018], (Mar. 12, 2018).

Intel, "Update to +CGDCONT and +CGCONTRDP for Reliable Data Service", 3GPP Draft; CI-174167 RDS VI, 3rd Generation Partnership Project (3GPP), Mobile Competence Centre; 650, Route Des Lucioles; F-06921 Sophia-Anti Polis Cedex; France vol. Ct WG1, No. Kochi (India), Retrieved from the Internet: <URL:http:/www.3gpp.org/ftp/tsg_ct/WGI_mmcc-sm_ex-CNI/TSGCI_106_Kochi/docs/> [retrieved on Oct. 16, 2017], (Oct. 16, 2017).

Intel, "Update to +CGDCONT and +CGCONTRDP for Reliable Data Off", 3GPP Draft; CI-174975 RDS PSDATAOFF VI, 3rd Generation Partnership Project T3GPP), Mobile Competence Centre ; 650, Route Des Lucioles ; F-06921 Sophia-Anti Polis Cedex ; France vol. CT WG1, no. Kochi (India), Retrieved from the Internet: URL:http ://www.3gpp.org/ftp/tsg%5Fct/WG1%5Fmm%2Dcc%2Dsm%5Fex%2DCN1/TSGC1%5 F107%5FReno/docs/ [retrieved on Nov. 20, 2017], (Nov. 20, 2017).

Intel, "Updates to PCO for RDS", 3GPP Draft'C1-173216 24008 E40 RDS PCO VI, 3rd Generation Partnership Project (3GPP), Mobile Competence Centre ; 650, Route Des Lucioles ; F-06921 Sophia-Anti Polis Cedex ; France vol. CT WG1, no. Krakow (Poland), Retrieved from the Internet: <URL:http://www.3gpp.org/ftp/Meetings 3GPPSYNC/CTI/Docs> [retrieved on Aug. 20, 2017], (Aug. 20, 2017).

* cited by examiner

ENABLING SUPPORT FOR RELIABLE DATA SERVICE AND PS DATA OFF

PRIORITY CLAIM

This application is a U.S. National Stage Filing under 35 U.S.C. 371 from International Application No. PCT/US2018/061930, filed Nov. 20, 2018 and published in English as WO 2019/100043 on May 23, 2019, which claims the benefit of priority to U.S. Provisional Patent Application Ser. No. 62/588,688, now filed Nov. 20, 2017, each of which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to improvements in reliable data service in communication networks.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. While the advent of any new technology, especially the introduction of a complex new communication system engenders a large amount of problems both in the system itself and in compatibility with previous systems and devices, issues continue to abound in existing systems. For example, coverage area and packet loss continue to plague both users and networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
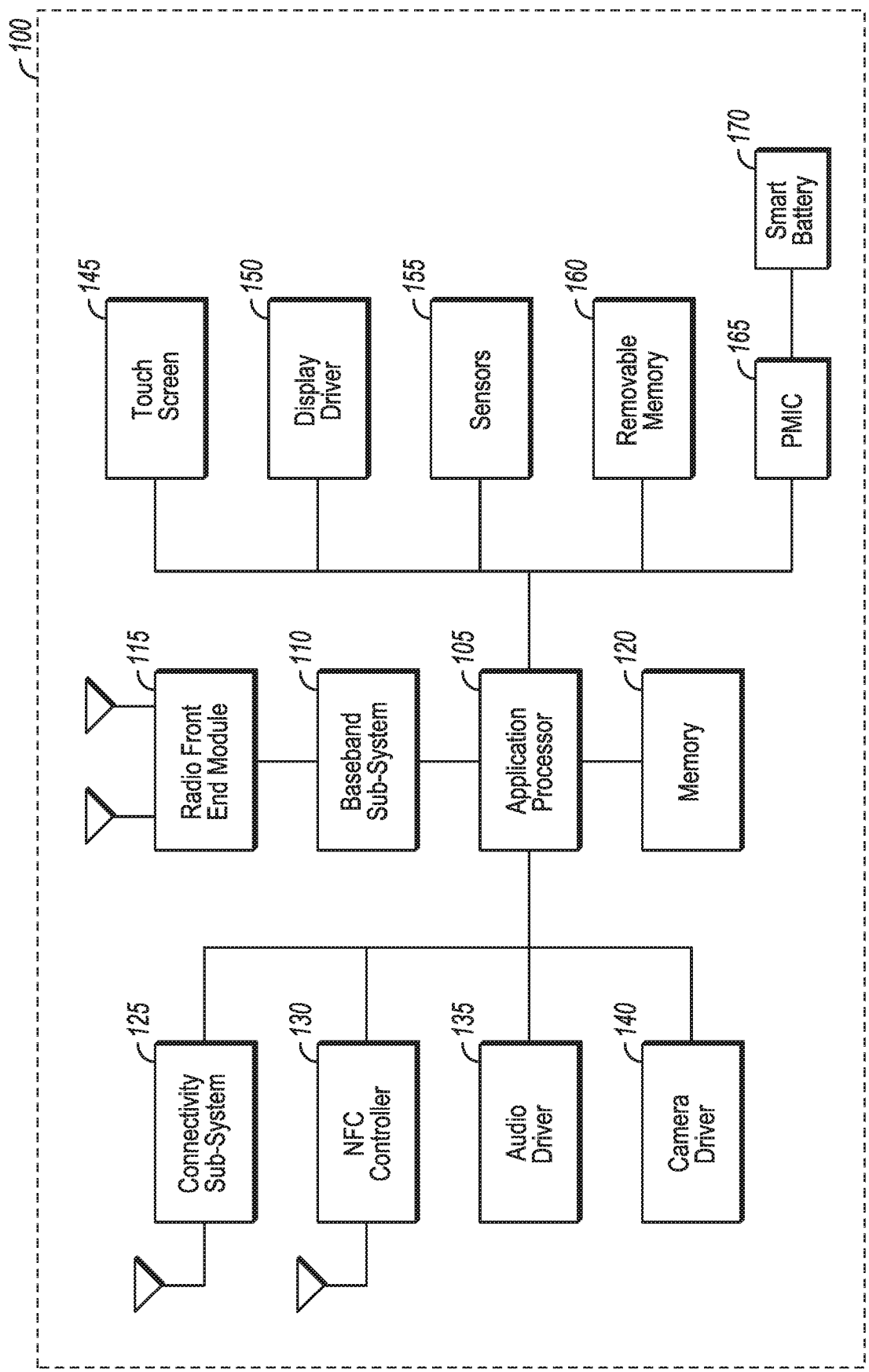
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G (3GPP NR), 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS). Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11 ad, IEEE 802.11 ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz. 37-38.6 GHz, 38.6-40 GHz, 42-42.5 GHz, 57-64 GHz, 71-76 GHz. 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz): the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
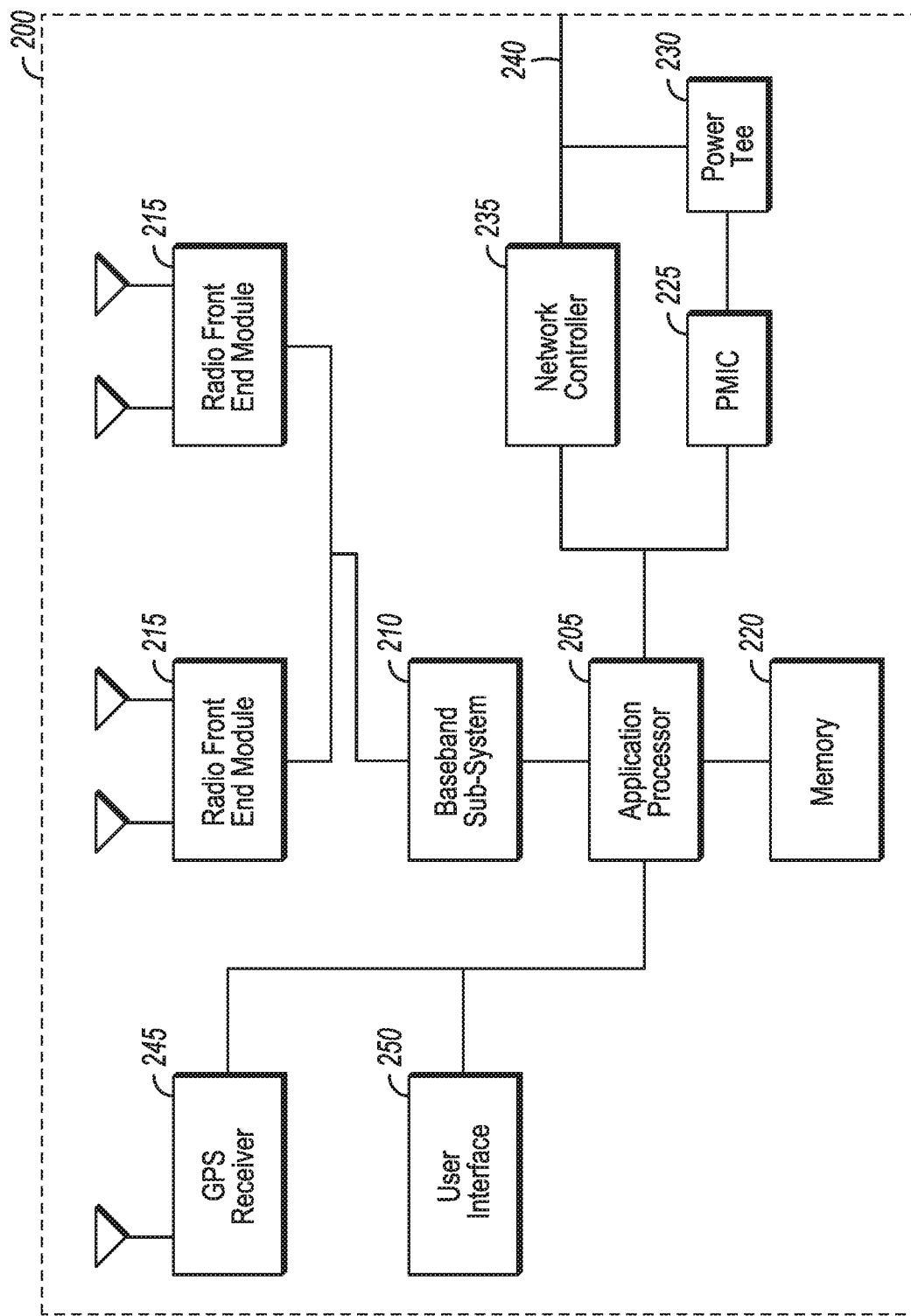
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
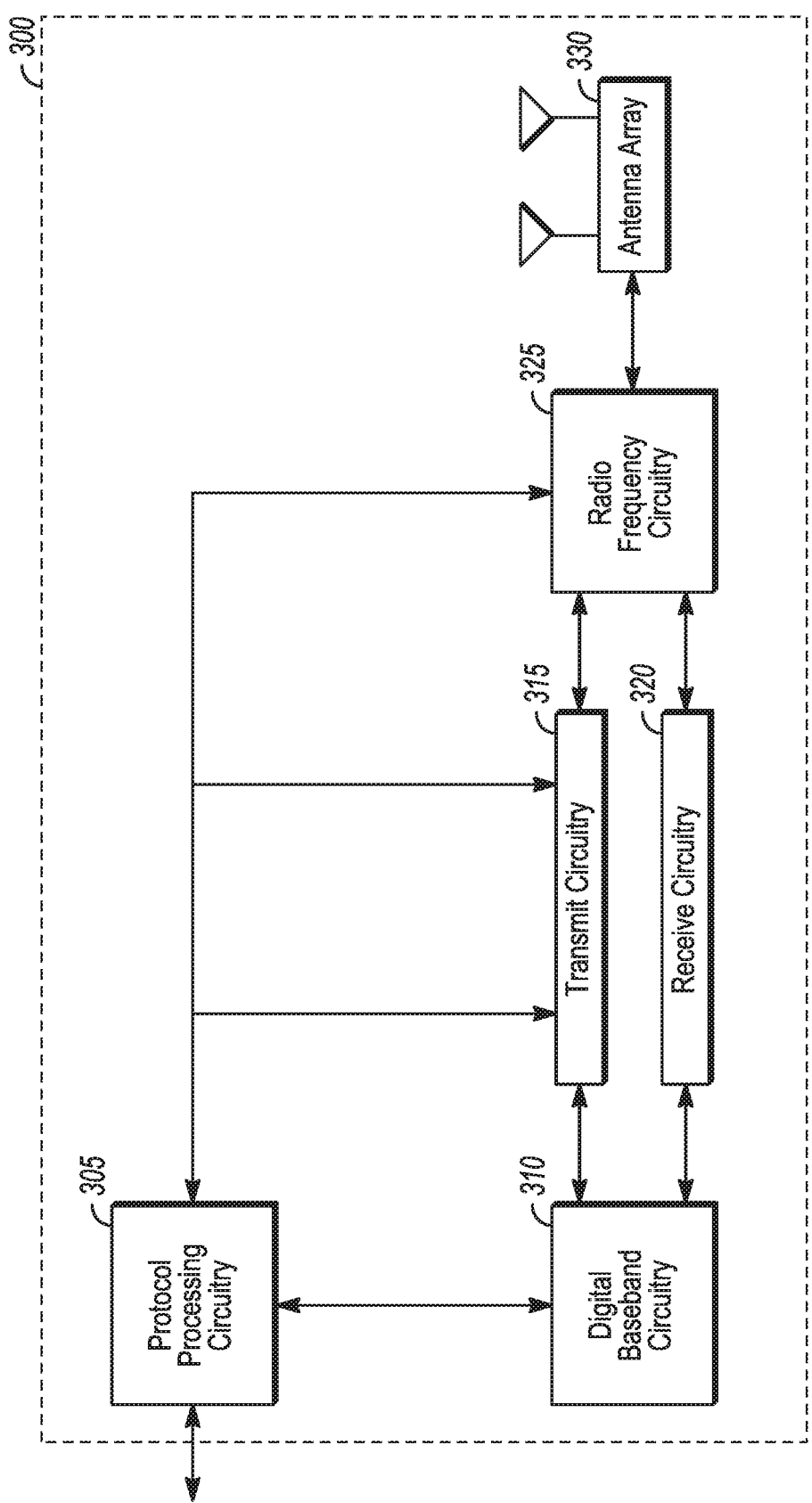
FIG. 3 illustrates millimeter wave communication circuitry in accordance with some embodiments.

FIG. 3 illustrates millimeter wave communication circuitry in accordance with some embodiments. Circuitry 30X) is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect sub-system, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
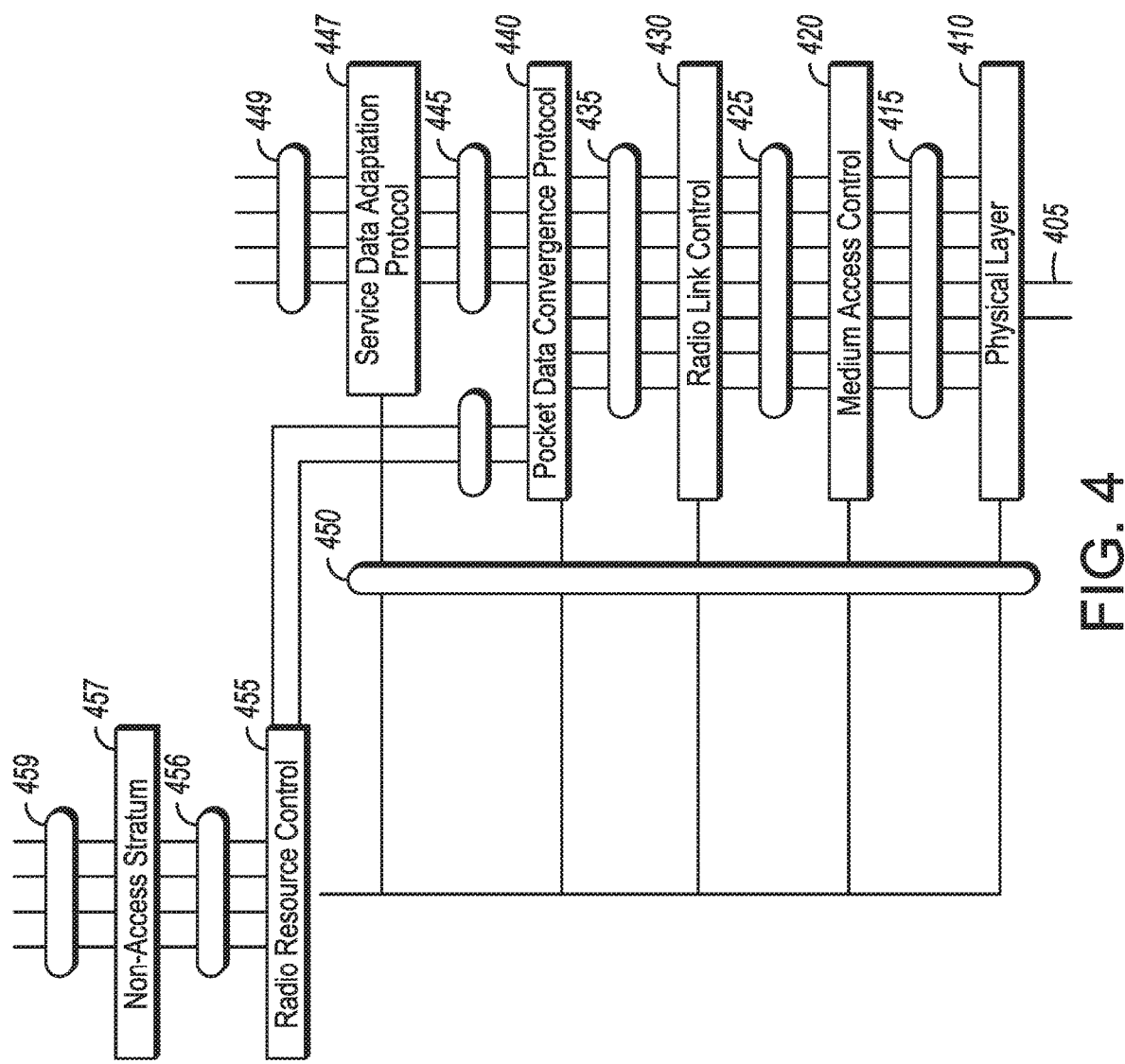
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 420 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
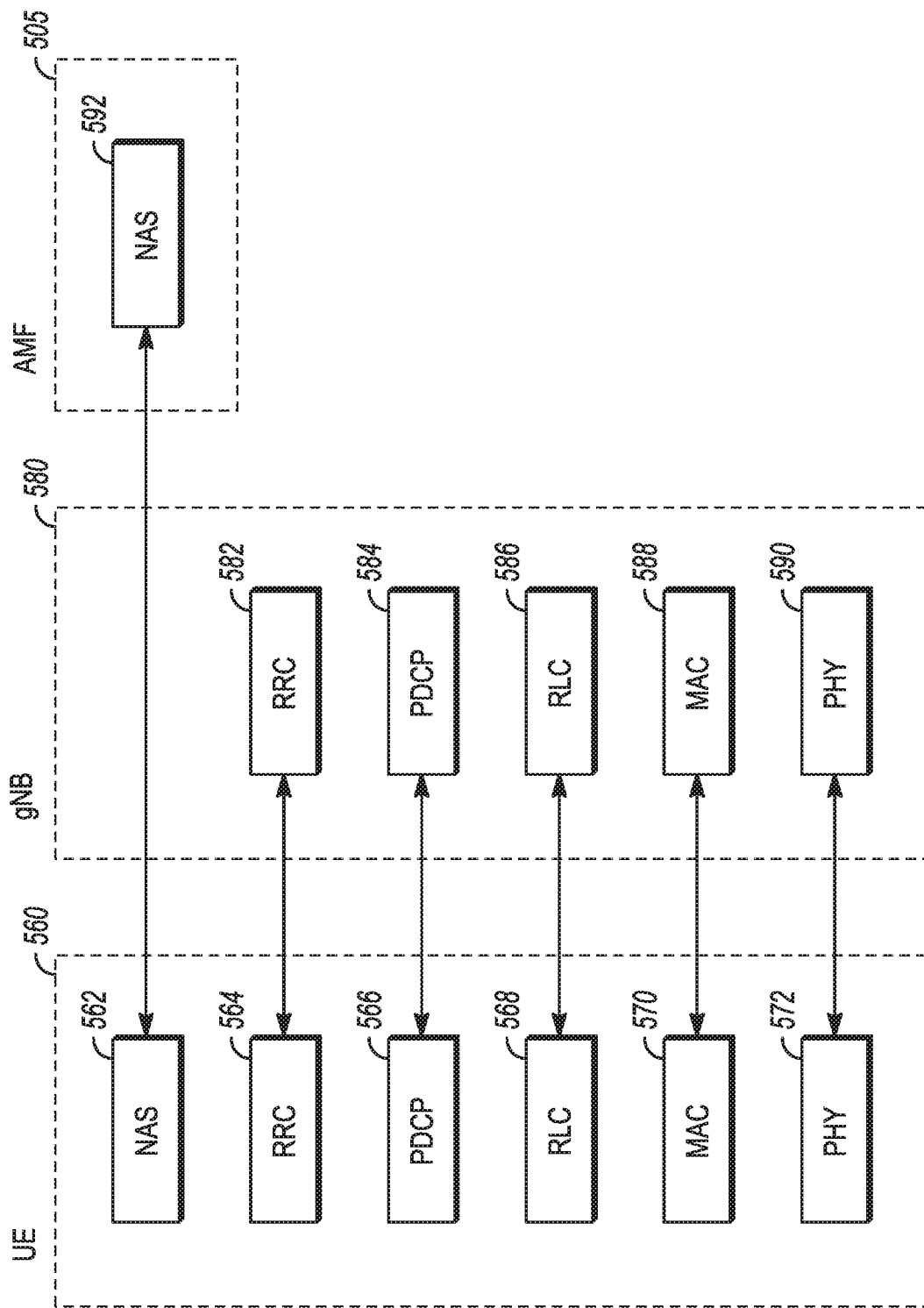
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects. NAS entities may exist in both the AMF 594 and a session management function (SMF) on the network side.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects. UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects. $T_s$ may be defined as $1/(30, 720\times1000)$ seconds. According to some aspects, a radio frame may be defined as having duration $30, 720$. $T_s$, and a slot may be defined as having duration $15,360$. $T_s$. According to some aspects, $T_s$ may be defined as $$T_s = 1/(\Delta f_{max} \cdot N_f),$$

where $\Delta f_{max} = 480 \times 10^3$ and $N_f = 4,096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK). 4 points, known as quadrature phase shift keying (QPSK), 16 points, known as quadrature amplitude modulation (QAM) with 16 points (16QAM or QAM 16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j2\pi f_k(t - T_{sym} - \tau_k)]$$

Where $p_T(t)$ is a prototype filter function. $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, 1) where k is the index number of subcarrier, in the range 0 to N·M-1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
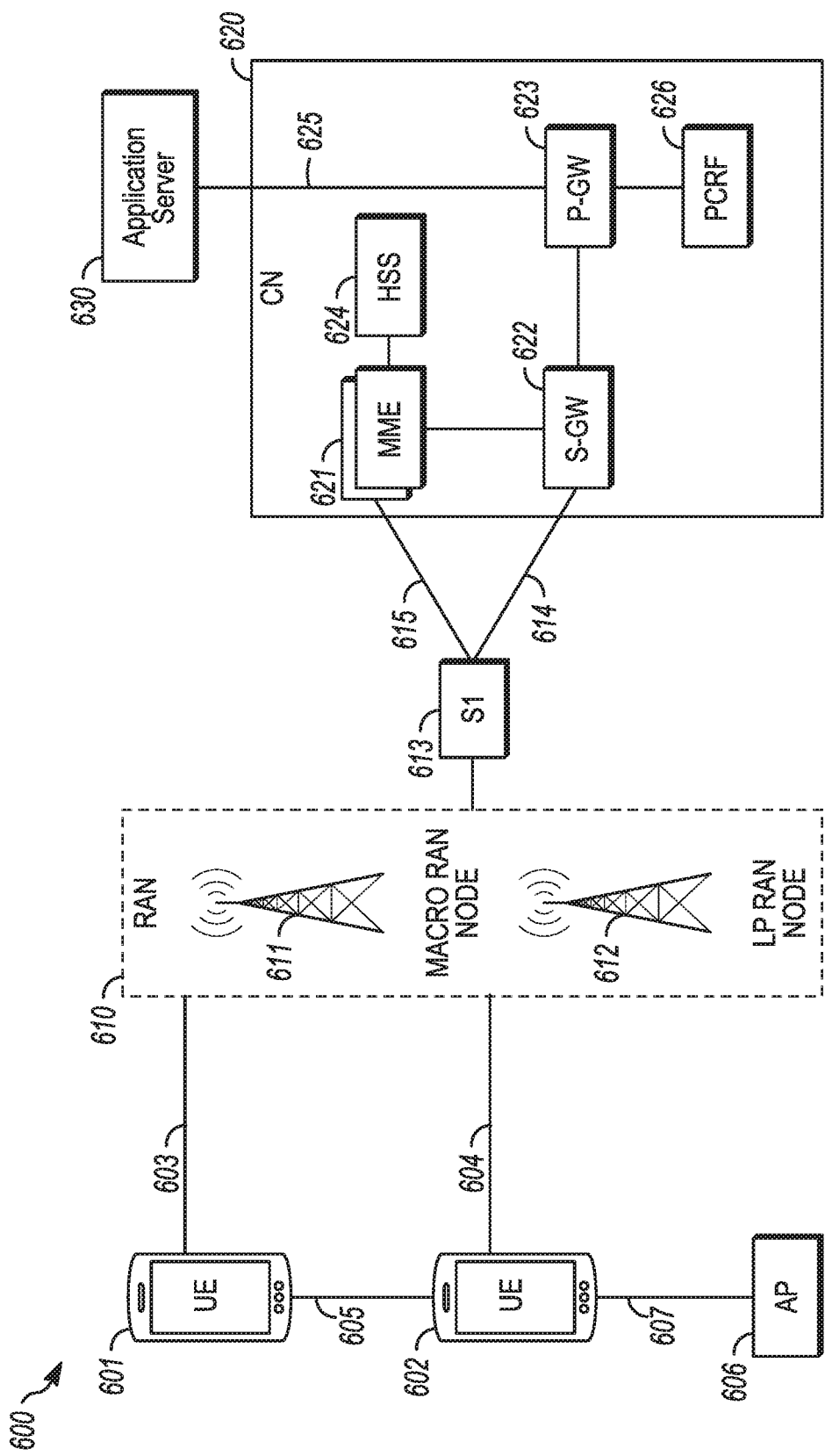
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) through a Service Capability Exposure Function (SCEF) 632 via an Internet Protocol (IP) interface 625. Generally, the application server 630 may be an element offering applications that use IP bearer resources with the core network (e.g., UMTS Packet Services (PS) domain. LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases. Accordingly, the memory of processors, the memory/storage devices, the peripheral devices, and the databases are examples of computer-readable and machine-readable media.

In the devices and systems above, various network components may include the Service Capability Exposure Function (SCEF), which is the entity within the 3GPP architecture for service capability exposure that provides the ability to securely expose the services and capabilities provided by 3GPP network interfaces. The SCEF allows for the discovery of the exposed service capabilities and provides access to network capabilities through homogenous network application programming interfaces (e.g. Network API). The SCEF abstracts the services from the underlying 3GPP network interfaces and protocols.

The SCEF may use device triggers and may perform monitoring and provide notifications of desired events to the Application Server (AS) or Service Capability Server (SCS) regarding a UE, as well as other functionality. The SCEF may be connected with the core network through a P-GW and reside either on the edge of an IoT core network or completely within the IoT domain. One newer functionality of the SCEF may be non-IP Data Delivery (NIDD). NIDD may help transfer data between the SCEF and the AS using APIs. The support of NIDD is part of CIoT EPS optimizations. Non-IP data over SCEF may use Data over NAS support and the implementation of a T6a-Diameter interface at the MME (the T6b-interface is between the SGSN and SCEF). A PDN Type "Non-IP" may be used for NIDD over SCEF. The T6a interface may provide a connection between the MME and SCEF to support Non-IP PDN connection establishment, mobile originated (MO) and mobile terminated (MT) Non-IP data and monitoring the event configuration at the MME.

Figure 7:
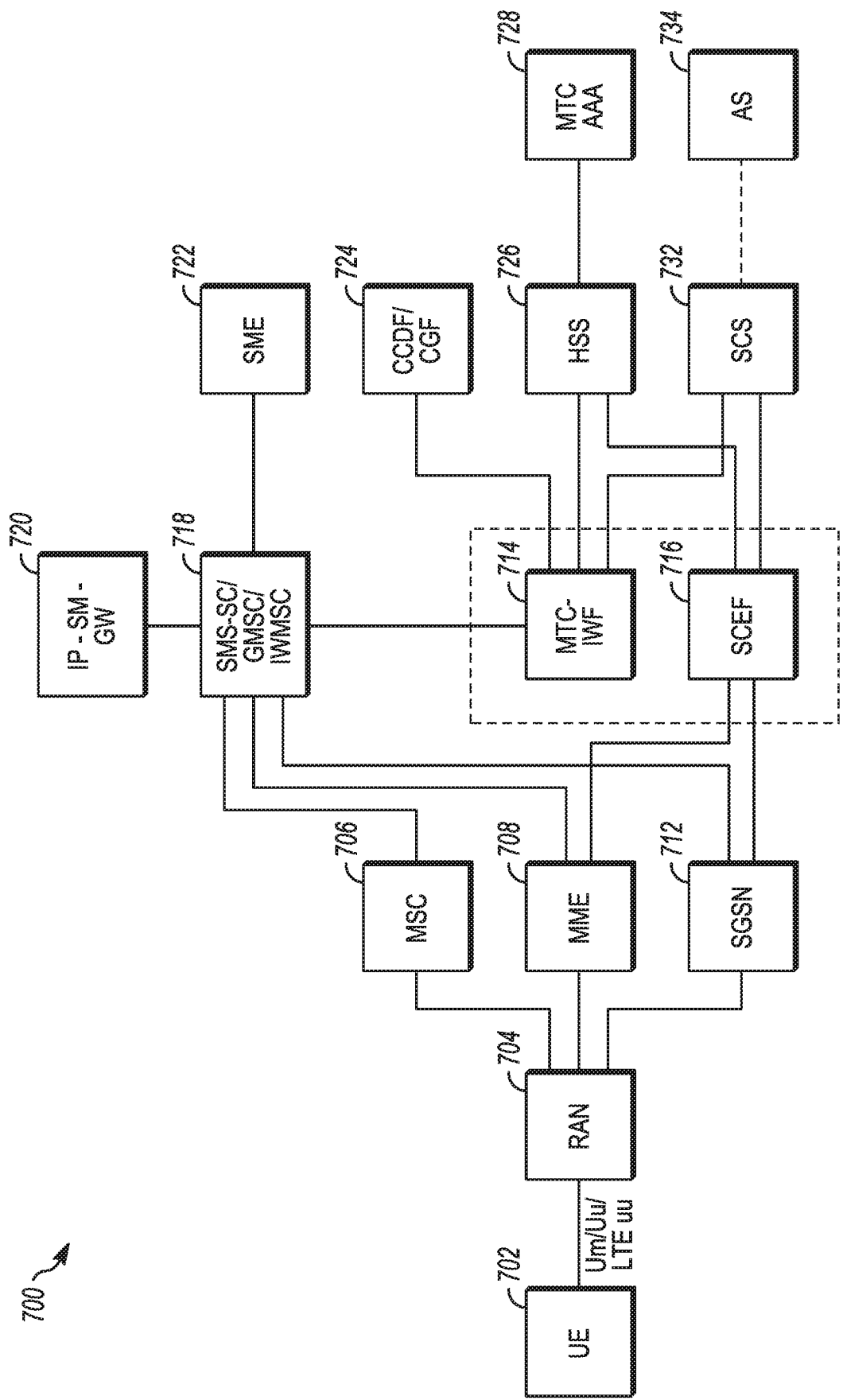
FIG. 7 illustrates control plane data transfer in accordance with some embodiments.

FIG. 7 illustrates control plane data transfer in accordance with some embodiments. As will be described in more detail below, the control plane data transfer is provided when Reliable Data Service (RDS) is active in the network 700. The UE 702 is used for MTC connecting to the 3GPP network (UTRAN, E-UTRAN, GERAN, etc.) via Um/Uu/LTE-Uu interfaces. FIG. 7 also shows the 3GPP network service capability exposure to the SCS 732 and AS 734. Control information from the UE 702 is provided to the RAN 704, which provides control messages to a Mobile Switching Center (MSC) 706, MME 708 and SGSN 710. Each of the MSC 706, MME 708 and SGSN 710 are connected to an Interworking Short Message Service-Service Center (SMS-SC)/Gateway MSC (GMSC)/SMS Interworking Mobile Services Switching Center (IWMSC) 718. The SMS-SC/GMSC/IWMSC 718 is connected to a Machine Type Communications-InterWorking Function (MTC-IWF) 714, Short Message Entity (SME) 722 and an IP SM gateway 720. The MTC-IWF 714 is connected to a Charging Data Function/Charging Gateway Function (CDF/CGF) 724, a HSS 726 of the UE 702 and a Services Capability Server (SCS) 732. The SCS 732 and HSS 726 are also connected with the SCEF 716, which is connected with the MME 708 and the SGSN 712. The HSS 726 is provided authorization for the UE 702 by an MTC AAA 728 with which the HSS 726 is connected. The SCS 732 is connected with the AS 734, from which the SCS 732 receives application data for the UE 702. The functionalities of the various components may be found in 3GPP TS 23.682.

In GSM, a UE may include several components: a Mobile Terminal (MT), which offers common functions such as: radio transmission and handover, speech encoding and decoding, error detection and correction, signalling and access to the SIM: a Terminal Equipment (TE), which is any device connected to the MS offering services to the user and does not contain any functions specific to GSM; a Terminal adapter (TA) that provides access to the MT as if it were an ISDN network termination with extended capabilities. Communication between the TE and MT over the TA takes place using AT commands. Subscriber identity module (SIM) that is a removable subscriber identification token storing the IMSI, a unique key shared with the mobile network operator and other data. In a UE, the MT, TA and TE may be enclosed in the same case. However, the MT and TE functions may be performed by different processors (the application processor may serve as a TE while the baseband processor may serve as a MT, communication between both takes place over a bus using AT commands, which serves as a TA).

Registration steps may be undertaken by both the UE and the AS before a NIDD transfer via the SCEF can be performed. Specifically, the UE may register with the SCEF, and the AS may register with the SCEF for a particular UE. The UE may indicate the availability of a bearer between the SCEF and MME to reach the UE. The SCEF may use both the S6t-interface (between the SCEF and the HSS) and the T6-interface as part of the registration procedures. The Diameter commands are defined in 3GPP TS 29.336, and the commands related to NIDD may include a NIDD Information Request (NIR) from the SCEF to the HSS and a NIDD Information Answer (NIA) from the HSS to the SCEF. The T6a-interface Diameter commands are defined in 3GPP TS 29.128, and the commands related to NIDD include a Connection Management Request (CMR), MO Data Request (ODR) and MT Data Answer (TDA) from the MME to the SCEF, and a Connection Management Answer (CMA), MO Data Request (ODR) and MT Data Request (TDR) from the SCEF to the MME. The call flows are defined in 3GPP TS 23.682.

The APIs for NIDD may be secured by the SCEF and the AS with a secure server. The AS registration with the SCEF (NIDD Configuration Procedure) may start with the AS registering for a particular UE. The API used for this registration may include one or more UEs and perhaps data for the UE(s). The API may include load information such as the number of NIDD messages and NIDD time duration. For each UE, the SCEF may perform authentication and authorization for the AS registration. The SCEF may then send via the S6t-interface a NIDD Information Request to the Home Subscriber Server (HSS), which may respond with a NIDD Information Answer via the S6t-interface. The NIA may include a 3GPP identifier of the UE, since the NIR may have used an external-ID of the UE. The NIA may also include load-control information. If there is data for a UE in the API, the data may be delivered to the UE per the call flow for downlink NIDD messages. After processing for all UEs in the API has been completed, the SCEF may respond to the AS with an OK.

The UE may also register with the SCEF via the T6a Connection Establishment Procedure. The UE may initiate an attachment procedure with the MME. During the Initial Attach procedure, the UE may indicate a desired connection for non-IP data. This registers the UE with the MME. The attach request may include Protocol Configuration Options (PCOs) from the UE. The MME may send a CMR to the SCEF via the T6a-interface. The PCOs (if present) may be included in an Extended-PCO AVP within the message to the SCEF. If an AS has not already registered with the SCEF for the UE, the SCEF may either reject the CMR or may initiate the NIDD Configuration Procedure for an AS. The SCEF may then send a CMA via the T6a-interface. The CMA may include the PCOs from the SCEF for the UE in an Extended-PCO AVP within the message.

Downlink NIDD from the AS to the UE may use an API to submit a NIDD request. The APIs may be built by Attention (AT) commands in accordance with 3GPP TS 27.007. The APIs may use AT commands that start with "+"—i.e., extended (non-basic) commands. There are four types of AT command operations: test, set, read and execute. The test operation is used to check whether the AT command is supported by the MT. The set operation is used to change the settings used by the MT. The read operation is used to retrieve the current settings used by the MT. The execution operation is used to perform an action or retrieve information/status about the MT.

When an upper layer application initiates a service, the upper layer application notifies the lower layer protocol stack of a message using an AT command. The message is processed by the protocol stack after being parsed, and a result of the processing is reported to the upper layer application using an AT command response. An AT Interpreter (ATI) parses the AT command. The ATI is located between the upper layer application and the bottom layer protocol stack.

After an AT command is issued, the ATI transmits the AT command to a NAS module of the corresponding mode depending on the current mode maintained by the protocol stack. As above, the operations implemented by AT commands include performing an action, e.g., activating a bearer; setting parameters, e.g., defining bearer context or setting QoS: querying parameters, e.g., querying attachment status or bearing TFT: and querying a value range of a parameter, e.g., querying a value range of QoS.

If the UE has registered with the SCEF, the SCEF may forward the request to the MME via the T6a-interface. Otherwise, the SCEF may either return an error to the AS or either use SMS to cause the UE to attach or respond immediately to the AS indicating delivery will be delayed, wait until the UE attaches and then continue with the remaining delivery operations. The MME may subsequently deliver the data to the UE. The MME may, however, only receive notification that the UE was successfully paged and may not know whether the UE successfully received the data. The MME may send an answer to the SCEF via the T6a-interface. If delivery was not successful due to the UE not being reachable, the SCEF may register with the MME via the T6a-interface to be notified when the UE becomes reachable and the SCEF may then delay the delivery. The SCEF may respond to the AS with an OK or delayed delivery message.

The call flow for uplink NIDD from UE to the AS may be similar to the downlink call flow. The UE may send data to the MME, which may forward the data to the SCEF via the T6a-interface. The SCEF may deliver the data to the AS using the callback provided by the AS during registration. The AS may send a response to the SCEF, which may then send an answer to the MME via the T6a-interface. The downlink NIDD procedure may be used when the Reliable Data Service (RDS) has been enabled and the UE had requested an acknowledgement that the uplink NIDD had been received.

As seen above, NIDD via the SCEF/P-GW may be unreliable as no mechanism exists for the SCEF to determine if downlink data was successfully delivered to the UE, which may occur, e.g., as a result of UE radio link failure or the UE being out of coverage. Nor is there a similar mechanism for the UE to determine whether the uplink data was successfully delivered to the SCEF/P-GW, which may occur, e.g., in case of T6a-b connection failure or SCEF congestion. Networks can offer RDS as value added service to their customers, for example, to avoid the overhead of extra UE battery consumption that can happen due to application level acknowledgement. In some embodiments, the MME can signal to the UE whether RDS is enabled or not for a particular PDN connection based on support from the network.

Moreover, 3GPP networks can be overloaded through support of all public safety services. PS Data Off (PSDO) is a feature that, when activated by the user, may prevent transport via 3GPP access of all IP packets except those related to 3GPP PS Data Off Exempt Services. The 3GPP PS Data Off Exempt Services are a set of operator services that are the only allowed services when the 3GPP PS Data Off feature has been activated by the user. PSDO may be configured by the HPLMN and activated by the user.

When 3GPP PSDO is activated in the UE, the UE may inform the network that 3GPP PSDO is activated. At this point, the UE may no longer transmit UL IP Packets of services that are not 3GPP PSDO Exempt Services, and the network may no longer transmit DL IP Packets to the UE for services that are not 3GPP PSDO Exempt Services. The services that are configurable by the HPLMN operator on a per PLMN basis to be part of the 3GPP PSDO Exempt Services may include MMTel Voice/Video; SMS over IMS; USSD over IMS (USSI): particular IMS services not defined by 3GPP, where each such IMS service is identified by an IMS communication service identifier: Device Management over PS; and IMS Supplementary Service configuration via the Ut interface using XCAP.

The UE may discover whether a P-GW supports the 3GPP PSDO feature during Initial Attach to the network and during the establishment of a PDN connection via the presence of the 3GPP PSDO Support Indication in the Create Session response message from the S-GW to the MME. The UE may report the 3GPP PS Data Off status in the PCO to the P-GW during Initial Attach procedure. It would be desirable for the MME to signal to the UE whether PSDO is enabled and also to subsequently signal if the PSDO status changes.

Currently there are no NAS layer protocols to ensure reliable delivery of non-IP data. Upper layers at the transport and application layer ensure reliable delivery using retransmissions and other mechanisms. Similarly, limitations on the amount of PS data used by 3GPP networks are unavailable. The application layer solutions may result in larger timeouts and increased delay in packet delivery, in addition to larger data transmissions and retransmissions due to the increased packet size at application and upper layers.

As above, RDS may support peer-to-peer data transfers and provide reliable data delivery between the MT and the SCEF or P-GW on a per-PDN connection basis. The data may be transferred via a PDN connection between the MT and SCEF/P-GW. A UE can connect to one or more ASs or SCSs via the SCEF or P-GW. RDS may support multiple applications on the UE to simultaneously conduct data transfers with peer entities on the SCEF/P-GW using a single PDN connection between the MT and SCEF. RDS may support both acknowledged and unacknowledged data transfers.

The support for RDS feature negotiation using PCO is incorporated in 3GPP TS 24.301 and TS 24.008. Support for PSDO is incorporated in TS 24.301 and TS 24.008. However, the support for PSDO features may not be available in communication between the MT and TE. Adding support for RDS and PSDO may permit the ME to communicate its status to the MT and enable usage, testing and status reporting of the feature.

Stage-3 modifications and updates to relevant 3GPP specifications (TS 27.007) for specifying AT Commands to handle RDS and PSDO capability are described below. In particular, a parameter <Reliable_Data_Service> may be added as a parameter in the AT commands that are used to define a PDN connection for EPS (+CGDCONT) and to define an EPS Bearer Resource for a specific PDN for EPS (+CGDSCONT). The use of the parameter <Reliable_Data_Service> in these AT commands may permit the TE to set or query the applicability of RDS for a PDN connection.

In addition, a parameter <PS_Data_Off_Status> may be added as a parameter in the +CGDCONT AT command, which may allow the TE to indicate the PS Data Off status to network during PDN activation. A parameter <PS_Data_Off_Support> may be added as a parameter in the +CGDSCONT AT command, which allows the network to indicate support for PS Data Off to the TE. A further +CGPSDSTAT AT command may be added to indicate a change in the PS Data Off Status while the PDN connection is active. The change in the PS Data Off Status using the +CGPSDSTAT AT command may be updated by the TE to the MT. Alternatively, a new AT command (+CPSDO) may be used to indicate the status of the PSDO for the UE during one of a number of network procedures.

The AT+CGDCONT AT command sets the PDP context parameters such as PDP type (IP, IPV6, PPP, X.25 etc), APN, data compression, header compression etc. The +CGDCONT AT command parameter command syntax is given by:

| Command | Possible response(s) |
| --- | --- |
| +CGDCONT=[<cid>[,<PDP_type>[,<APN>[,<PDP_addr>[,<d_comp>[,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>][,<Non-IP_MTU_discovery>]][,<Reliable_Data_Service>][,<PS_Data_Off_Status>]]]]]]]]]]]] | |
| +CGDCONT? | [+CGDCONT: <cid>,<PDP_type>,<APN>,<PDP_addr>,<d_comp>,<h_comp>[,<IPv4AddrAlloc>],<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<PS_Data_Off_Status>]]]]]]]]]] [<CR><LF>+CGDCONT: <cid>,<PDP_type>,<APN>,<PDP_addr>,<d_comp>,<h_comp>[,<IPv4AddrAlloc>[,<request_type>[,<P-CSCF_discovery>],<[M_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<PS_Data Off_Status>]]]]]]]]]] [...]] |
| +CGDCONT=? | +CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s) ,(list of supported <NSLPI>s),(list of supported <securePCO>s),(list of supported <IPv4_MTU_discovery>s),(list of supported <Local_Addr_Ind>s),(list of supported <Non-IPMTUdiscovery>s) [<CR><LF>+CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s) ,(list of supported <NSLPI>s),(list of supported <securePCO>s,(list of supported <IPv4_MTU_discovery>s),(list of |

| Command | Possible response(s) |
|---------|----------------------|
| | supported <Local_Addr_Ind>s) ,(list of supported <Non-IP_MTU_discovery>s),(list of supported <Reliable_Data_Service>s) ,(list of supported <PS_Data_Off_Status>s) [...]] |

The set command specifies PDP context parameter values for a PDP context identified by the (local) context identification parameter, <cid>, and also allows the TE to specify whether security-protected transmission of EPS Session Management (ESM) information is requested, as the PCO can include information that is to use ciphering. There can be other reasons for the UE to use security-protected transmission of ESM information, e.g. if the UE is to transfer an APN. The number of PDP contexts that may be in a defined state at the same time may be given by the range returned by the test command.

For EPS, the PDN connection and its associated EPS default bearer is identified herewith. A special form of the set command, +CGDCONT=<cid> causes the values for context number <cid> to become undefined. If the initial PDP context is supported, the context with <cid>=0 is automatically defined at startup, per 3GPP TS 27.007 subclause 10.1.0. That is, when the context with <cid>=0 (context number 0) is defined upon startup, it may not be created with the +CGDCONT command. The initial PDP context has particular manufacturer specific default settings disassociated with any other default settings of +CGDCONT. When in E-UTRAN or according to the AT-command+CIPCA in GERAN and UTRAN, the initial PDP context may be automatically activated by the MT following a successful registration to the network. If all active contexts are deactivated, the initial PDP context can be (re)established. This is manufacturer specific and may depend on the current RAT as well as how the active contexts are deactivated.

As all other contexts, the parameters for <cid>=0 can be modified to with +CGDCONT. If the initial PDP context is supported, +CGDCONT=0 resets context number 0 to its particular default settings.

The read command returns the current settings for each defined context. The test command returns values supported as compound values. If the MT supports several PDP types, <PDP_type>, the parameter value ranges for each <PDP_type> may be returned on a separate line.

The defined values include <cid>: integer type; specifies a particular PDP context definition. The parameter is local to the TE-MT interface and is used in other PDP context-related commands. The range of permitted values (minimum value=1 or if the initial PDP context is supported, minimum value=0) is returned by the test form of the command. The <cid> s for network-initiated PDP contexts may have values outside the ranges indicated for the <cid> in the test form of the commands+CGDCONT and +CGDSCONT.

The defined values also include <PDP_type>: string type; specifies the type of packet data protocol. The default value is manufacturer specific. The types may include values supported for EPS services: IP, IPv6 6, IPv4v6 Virtual <PDP_type> introduced to handle dual IP stack UE capability, Point to Point Protocol (PPP) and Non-IP Transfer of Non-IP data to external packet data network, as well as several obsolete types not mentioned. This list may be expanded in the future to handle new types.

The defined values also include <APN>: string type: a logical name that is used to select the GPRS support node (GGSN) or the external packet data network. If the value is null or omitted, then the subscription value is requested.

The defined values also include <PDP_addr>: string type; identifies the MT in the address space applicable to the PDP. When +CGPIAF is supported, its settings can influence the format of this parameter returned with the read form of +CGDCONT. The value of this parameter is ignored with the set command. The parameter is included in the set command only for backwards compatibility reasons.

The defined values also include <d_comp>: integer type; controls PDP data compression (applicable for SNDCP only). The values of <d_comp> include: 0 off; 1 on (manufacturer preferred compression); 2 V.42bis; and 3 V.44.

The defined values also include <h_comp>: integer type; controls PDP header compression. The values of <h_comp> include: 0 off; 1 on (manufacturer preferred compression); 2 RFC 1144 (applicable for SNDCP only); 3 RFC 2507; 4 RFC 3095 (applicable for PDCP only).

The defined values also include <IPv4AddrAlloc>: integer type; controls how the MT/TA requests to get the IPv4 address information. The values of <IPv4AddrAlloc> include: 0 IPv4 address allocation through NAS signalling or 1 IPv4 address allocated through DHCP.

The defined values also include <request_type>: integer type; indicates the type of PDP context activation request for the PDP context. If the initial PDP context is supported, it is not allowed to assign <cid>=0 for emergency bearer services. A separate PDP context is established for emergency bearer services. If the PDP context for emergency bearer services is the only activated context, only emergency calls are allowed. The values of <request_type> include: 0 PDP context is for new PDP context establishment or for handover from a non-3GPP access network (how the MT decides whether the PDP context is for new PDP context establishment or for handover is implementation specific): 1 PDP context is for emergency bearer services; 2 PDP context is for new PDP context establishment; 3 PDP context is for handover from a non-3GPP access network; 4 PDP context is for handover of emergency bearer services from a non-3GPP access network. A PDP context established for handover of emergency bearer services from a non-3GPP access network has the same status as a PDP context for emergency bearer services.

The defined values also include <P-CSCF_discovery>: integer type: influences how the MT/TA requests to get the P-CSCF address. The values of <P-CSCF_discovery> include: 0 Preference of P-CSCF address discovery not influenced by +CGDCONT, 1 Preference of P-CSCF address discovery through NAS signalling, 2 Preference of P-CSCF address discovery through DHCP.

The defined values also include <IM_CN_Signalling_Flag_Ind>: integer type; indicates to the network whether or not the PDP context is for IM CN subsystem-related signalling only. The values of <IM_CN_Signalling_Flag_Ind> include: 0 UE indicates that the PDP context is not for IM CN subsystem-related signalling only and 1 UE indicates that the PDP context is for IM CN subsystem-related signalling only.

The defined values also include <NSLPI>: integer type; indicates the NAS signalling priority requested for this PDP context. The values of <NSLPI> include: 0 indicates that this PDP context is to be activated with the value for the low priority indicator configured in the MT and 1 indicates that this PDP context is to be activated with the value for the low priority indicator set to "MS is not configured for NAS signalling low priority".

The defined values also include <securePCO>: integer type, which specifies if security protected transmission of PCO is or is not requested. The values of <securePCO> include: 0 Security protected transmission of PCO is not requested and 1 Security protected transmission of PCO is requested.

The defined values also include <IPv4_MTU_discovery>: integer type: influences how the MTTA requests to get the IPv4 MTU size. The values of <IPv4_MTU_discovery> include: 0 Preference of IPv4 MTU size discovery not influenced by +CGDCONT and 1 Preference of IPv4 MTU size discovery through NAS signaling.

The defined values also include <Local_Addr_Ind>: integer type; indicates to the network whether or not the MS supports local IP address in TFTs. The values of <Local_Addr_Ind> include: 0 indicates that the MS does not support local IP address in TFTs and 1 indicates that the MS supports local IP address in TFTs.

The defined values also include Non-IP_MTU_discovery>: integer type; influences how the MT/TA requests to get the Non-IP MTU size. The values of <Non-IP_MTU_discovery> include: 0 Preference of Non-IP MTU size discovery not influenced by +CGDCONT and 1 Preference of Non-IP MTU size discovery through NAS signaling.

The defined values also include <Reliable_Data_Service>: integer type; indicates whether the UE is using Reliable Data Service for a PDN connection or not The values of <Reliable_Data_Service>: include: 0 Reliable Data Service is not being used for the PDN connection and 1 Reliable Data Service is being used for the PDN connection.

The defined values also include <PS_Data_Off_Status>: integer type: indicates the UE status of PS data off for a PDN connection to the network. The values of <PS_Data_Off_Status> include: 0 indicates that PS data off UE status is unknown, 1 indicates that PS data off UE status is deactivated and 2 indicates that PS data off UE status is activated.

The AT+CGCONTRDP AT command returns active PDP parameters such as APN, IP address, subnet mask, gateway address, primary and secondary DNS address etc. The +CGCONTRDP AT command parameter command syntax is given by:

| Command | Possible response(s) |
|---|---|
| +CGCONTRDP[=<cid>] | [+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>[,<Local_Addr_Ind>[,<Non-IP_MTU>[,<Serving_PLMN_rate_control_value>[,<Reliable_Data_Service>[,<PS_Data_Off_Support>]]]]]]]]]]]]]]]]<br>[<CR><LF>+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>[,<Local_Addr_Ind>[,<Non-IP_MTU>[,<Serving_PLMN_rate_control_value>[,<Reliable_Data_Service>[,<PS_Data_Off_Support>]]]]]]]]]]]]]]]]<br>[...]] |
| +CGCONTRDP=? | +CGCONTRDP: (list of <cid>s associated with active contexts) |

NOTE:
The syntax of the AT Set Command is corrected to be according to ITU-T Recommendation V.250 [14]. Older versions of the specification specify incorrect syntax +CGCONTRDP=[<cid>]

The execution command returns the relevant information <bearer_id>, <apn>, <local_addr and subnet_mask>, <gw_addr>, <DNS_prim_addr>, <DNS_sec_addr>, <P-CSCF_prim_addr>, <P-CSCF_sec_addr>, <IM_CN_Signalling_Flag>. <LIPA_indication>, <IPv4_MTU>, <WLAN_Offload>, <Non-IP_MTU>, <Serving_PLMN_rate_control_value>, <Reliable_Data_Service> and <PS_Data_Off_Support> for an active non secondary PDP context with the context identifier <cid>. If the MT indicates more than two IP addresses of P-CSCF servers or more than two IP addresses of DNS servers, multiple lines of information per <cid> will be returned. If the MT has dual stack capabilities, at least one pair of lines with information is returned per <cid>: first one line with the IPv4 parameters followed by one line with the IPv6 parameters. If this MT with dual stack capabilities indicates more than two IP addresses of P-CSCF servers or more than two IP addresses of DNS servers, multiple of such pairs of lines are returned. If the MT doesn't have all the IP addresses to be included in a line, e.g. in case the UE received four IP addresses of DNS servers and two IP addresses of P-CSCF servers, the parameter value representing an IP address that cannot be populated is set to an empty string or an absent string. If the parameter <cid> is omitted, the relevant information for all active non secondary PDP contexts is returned. The test command returns a list of <cid> s associated with active non secondary contexts.

The defined values include <cid>: integer type; specifies a particular non secondary PDP context definition. The parameter is local to the TE-MT interface and is used in other PDP context-related commands (see the +CGDCONT and +CGDSCONT commands). The defined values also include <bearer_id>: integer type: identifies the bearer, i.e. the EPS bearer in EPS and the NSAPI in UMTS/GPRS.

The defined values also include <apn>: string type; a logical name that was used to select the GGSN or the external packet data network. The defined values also include <local_addr and subnet_mask>: string type; shows the IP address and subnet mask of the MT. The string is given as dot-separated numeric (0-255) parameters on the form: "a1.a2.a3.a4.m1.m2.m3.m4" for IPv4 or "a1.a2.a3.a4.a5.a6.a7.a89.a9.a11.a12.a13.a14.a15.a16.m1.m2.m3.m4.m5.m6, m7.m8.m9.m10.m11.m12.m13.m14.m15.m16" for IPv6. When +CGPIAF is supported, its settings can influence the format of this parameter returned with the execute form of +CGCONTRDP.

The defined values also include <gw_addr>: string type; shows the Gateway Address of the MT. The string is given as dot-separated numeric (0-255) parameters. When +CGPIAF is supported, its settings can influence the format of this parameter returned with the execute form of +CGCONTRDP.

The defined values also include <DNS_prim_addr>: string type; shows the IP address of the primary DNS server. When +CGPIAF is supported, its settings can influence the format of this parameter returned with the execute form of +CGCONTRDP.

The defined values also include <DNS_sec_addr>: string type; shows the IP address of the secondary DNS server. When +CGPIAF is supported, its settings can influence the format of this parameter returned with the execute form of +CGCONTRDP.

The defined values also include <P_CSCF_prim_addr>: string type: shows the IP address of the primary P-CSCF server. When +CGPIAF is supported, its settings can influence the format of this parameter returned with the execute form of +CGCONTRDP.

The defined values also include <P_CSCF_sec_addr>: string type: shows the IP address of the secondary P-CSCF server. When +CGPIAF is supported, its settings can influence the format of this parameter returned with the execute form of +CGCONTRDP.

The defined values also include <IM_CN_Signalling_Flag>: integer type; shows whether the PDP context is for IM CN subsystem-related signalling only or not. The values may be 0 PDP context is not for IM CN subsystem-related signalling only or 1 PDP context is for IM CN subsystem-related signalling only.

The defined values also include <LIPA_indication>: integer type; indicates that the PDP context provides connectivity using a LIPA PDN connection. This parameter cannot be set by the TE. The values may be 0 indication not received that the PDP context provides connectivity using a LIPA PDN connection or 1 indication received that the PDP context provides connectivity using a LIPA PDN connection.

The defined values also include <IPv4_MTU>: integer type; shows the IPv4 MTU size in octets. The defined values also include <WLAN_Offload>: integer type; indicates whether traffic can be offloaded using the specified PDN connection via a WLAN or not. This refers to bits 1 and 2 of the WLAN offload acceptability IE. The values may be 0 offloading the traffic of the PDN connection via a WLAN when in S1 mode or when in Iu mode is not acceptable, 1 offloading the traffic of the PDN connection via a WLAN when in S1 mode is acceptable, but not acceptable in Iu mode, 2 offloading the traffic of the PDN connection via a WLAN when in Iu mode is acceptable, but not acceptable in S1 mode, and 3 offloading the traffic of the PDN connection via a WLAN when in S1 mode or when in Iu mode is acceptable.

The defined values also include <Local_Addr_Ind>: integer type; indicates whether or not the MS and the network support local IP address in TFTs. The values may be 0 indicates that the MS or the network or both do not support local IP address in TFTs or 1 indicates that the MS and the network support local IP address in TFTs.

The defined values also include <Non-IP_MTU>: integer type; shows the Non-IP MTU size in octets. The defined values also include <Serving_PLMN_rate_control_value>: integer type: indicates the maximum number of uplink messages the UE is allowed to send in a 6 minute interval. This refers to octet 3 to 4 of the Serving PLMN rate control IE.

The defined values also include <Reliable_Data_Service>: integer type; indicates whether or not the UE is using Reliable Data Service for a PDN connection. The values may be: 0 Reliable Data Service is not being used for the PDN connection, and 1 Reliable Data Service is being used for the PDN connection.

The defined values also include <PS_Data_Off_Support>: integer type; indicates whether or not the UE and the network support PS data off. The values may be 0 indicates that the UE or the network or both do not support PS data off and 1 indicates that the UE and the network support PS data off.

The +CGPSDSTAT AT command is a new AT command that returns the status of the PSDO. The +CGPSDSTAT AT command parameter command syntax is given by:

| Command | Possible response(s) |
| --- | --- |
| +CGPSDSTAT=[<cid>,[,<PS_Data_Off_Status >]] | |
| +CGPSDSTAT? | [+CGPSDSTAT: <cid>,<PS_Data_Off_Status>] [<CR><LF>+CGPSDSTAT: <cid>,<PS_Data_Off_Status> [...]] |
| +CGPSDSTAT=? | +CGPSDSTAT: (range of supported <cid>s), (list of supported <PS_Data_Off_Status>s) |

The PS Data Off Status command enables the TE to specify the PS data off UE status to network. The set command specifies the PS data off UE status for a PDP context identified by the (local) context identification parameter, <cid>. The read command returns the current PS data off status at the ME for each defined context. The test command returns values supported as compound values.

The defined values include <cid>: integer type; which specifies a particular PDP context definition. The parameter is local to the TE-MT interface and is used in other PDP context-related commands. The range of permitted values (minimum value=1) is returned by the test form of the command. The defined values also include <PS_Data_Off_Status>: integer type; indicates the UE status of PS data off for a PDN connection to the network. The values of <PS_Data_Off_Status> include: 0 indicates that PS data off UE status is unknown; 1 indicates that PS data off UE status is deactivated and 2 indicates that PS data off UE status is activated.

Figure 8:
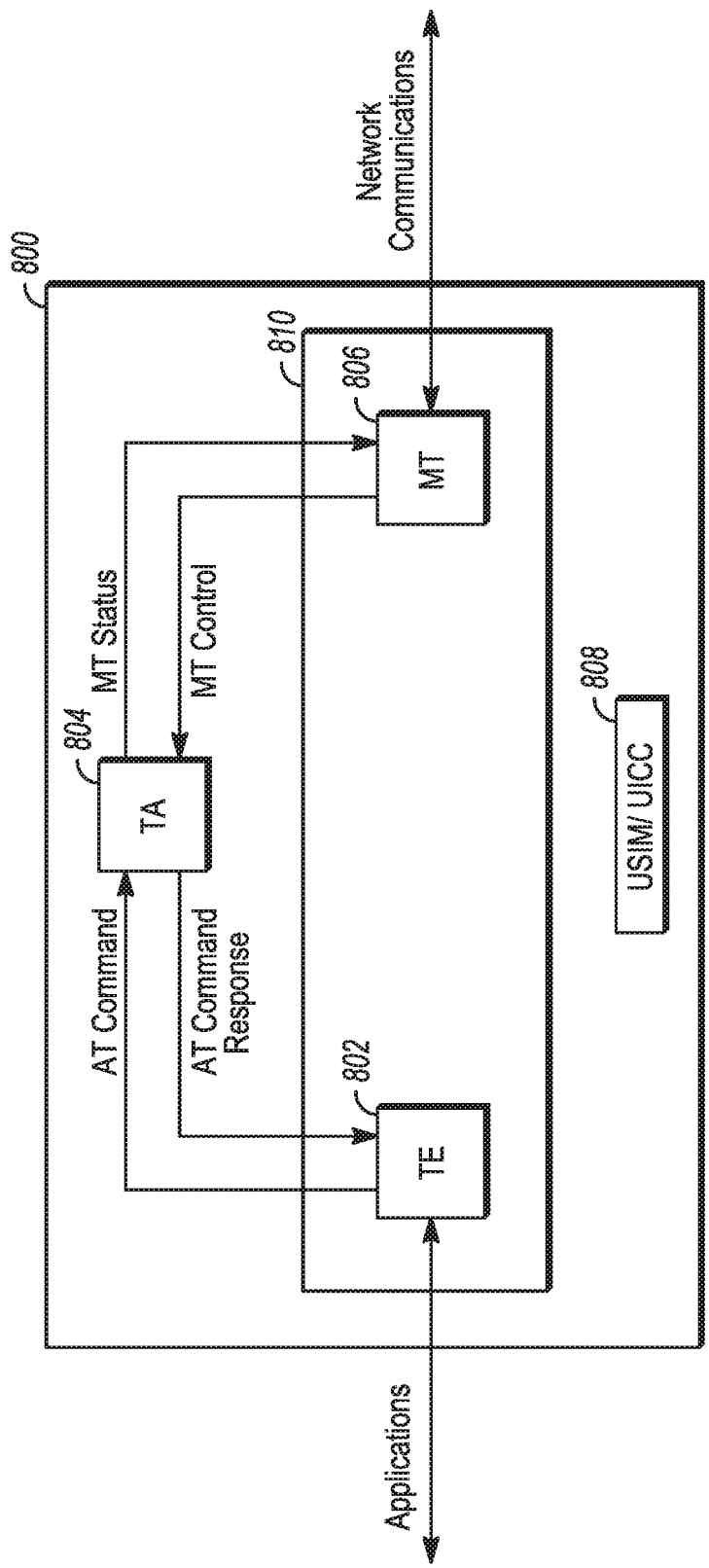
FIG. 8 illustrates a UE in accordance with some embodiments.

FIG. 8 illustrates a UE in accordance with some embodiments. The UE 800 contains a mobile equipment (ME) 810 that contains multiple modules, including a TE 802, a MT 806 and a TA 804 that acts as an interface between the TE 802 and the MT 806, as well as a Universal Subscriber Identity Module (USIM)/Universal Integrated Circuit Card (UICC) 808. The USIM/UICC 808 is an integrated circuit that stores the international mobile subscriber identity (IMSI) number and related key. Each of the TE 802. MT 806 and TA 804 may be implemented as a separate module or one or more may be integrated, as desired. Other elements may be present in the UE 800, but are not shown for convenience. The TE may include equipment that provides the functionality used for operation of the access protocols by the user (or a functional group on the user side of a user-network interface). The TE may include, for example, a processor. The MT may support functions specific to management of a public land mobile network (PLMN) access interface. The MT may include, for example, a modem or other type of transceiver.

As above, the TE 802 and MT 806 may be in separate 802 devices or within the same device. In a cellular device, for example, the TE 802 and MT 806 may be enclosed within the same case. The TE 802 and MT 806 functions may be performed by the same processor. In other embodiments, the TE 802 and MT 806 functions may be performed by distinct processors. For example, an application processor may serve as the TE 802 and a baseband processor may serve as the MT 806. Communication between the TE 802 and MT 806 may take place over a bus using AT commands (which may serve as the TA 804). The MT 806 may allow the UE to communicate with a network endpoint. For example, the MT 806 may transmit attach requests or PDN connectivity requests to establish one or more bearers. The attach requests may logically terminate at the MME for LTE/4G (or lower) network connections or the AMF/SMF in 5GS network connections.

The TE 802 may desire to set or determine the applicability of Reliable Data Service for a PDN connection. In response, the TE 802 may respectively transmit the AT+CGDCONT command or AT+CGCONTRDP command to the MT 806 via the TA 804, which converts the AT command to an MT control signal. As above, each AT command may include the CID parameter to identify the specific PDP context (and the associated bearer) to which the AT command applies. The MT 806 may return to the TE 802 via the TA 804, which converts the MT status to an AT response.

The AT+CGDCONT command may also be used by the TE 802 to indicate the PS Data Off status to the network during PDN activation. The network may similarly indicate support for PS Data Off to the TE 802 using the AT+CGDSCONT command.

In some cases, the PS Data Off Status may change during the lifetime of the PDN connection. The TE 802 may signal this change to the MT 806 using the AT+CGPSDSTAT command, which may then signal this change to the network as described.

Alternatively, an AT+CPSDO command may be used. The AT +CPSDO set command may enable the UE to specify the PSDO UE status to the network during each of the attach procedure, a UE-requested PDN connectivity procedure, or a UE-requested bearer modification procedure. The PS data off UE status may be activated or deactivated.

| +CPSDO parameter command syntax | |
|---|---|
| Command | Possible response(s) |
| +CPSDO=[<PS_Data_Off_Status >]<br>+CPSDO?<br>+CPSDO=? | +CME ERROR: <err><br>+CPSDO: <PS_Data_Off_Status><br>+CPSDO: (list of supported<br><PS_Data_Off_Status>s) |

The defined values of <PS_Data_Off_Status>: integer type, indicates the PS data off UE status may either be 0, which indicates to the network that PS data off UE status is deactivated, or 1, which indicates to the network that PS data off UE status is activated. As shown, the set command may return an OK or an error value. The read command (+CPSDO?) returns the current settings for PS data off UE status and the test command (+CPSDO=?) returns values supported as a compound value.

Figure 9:
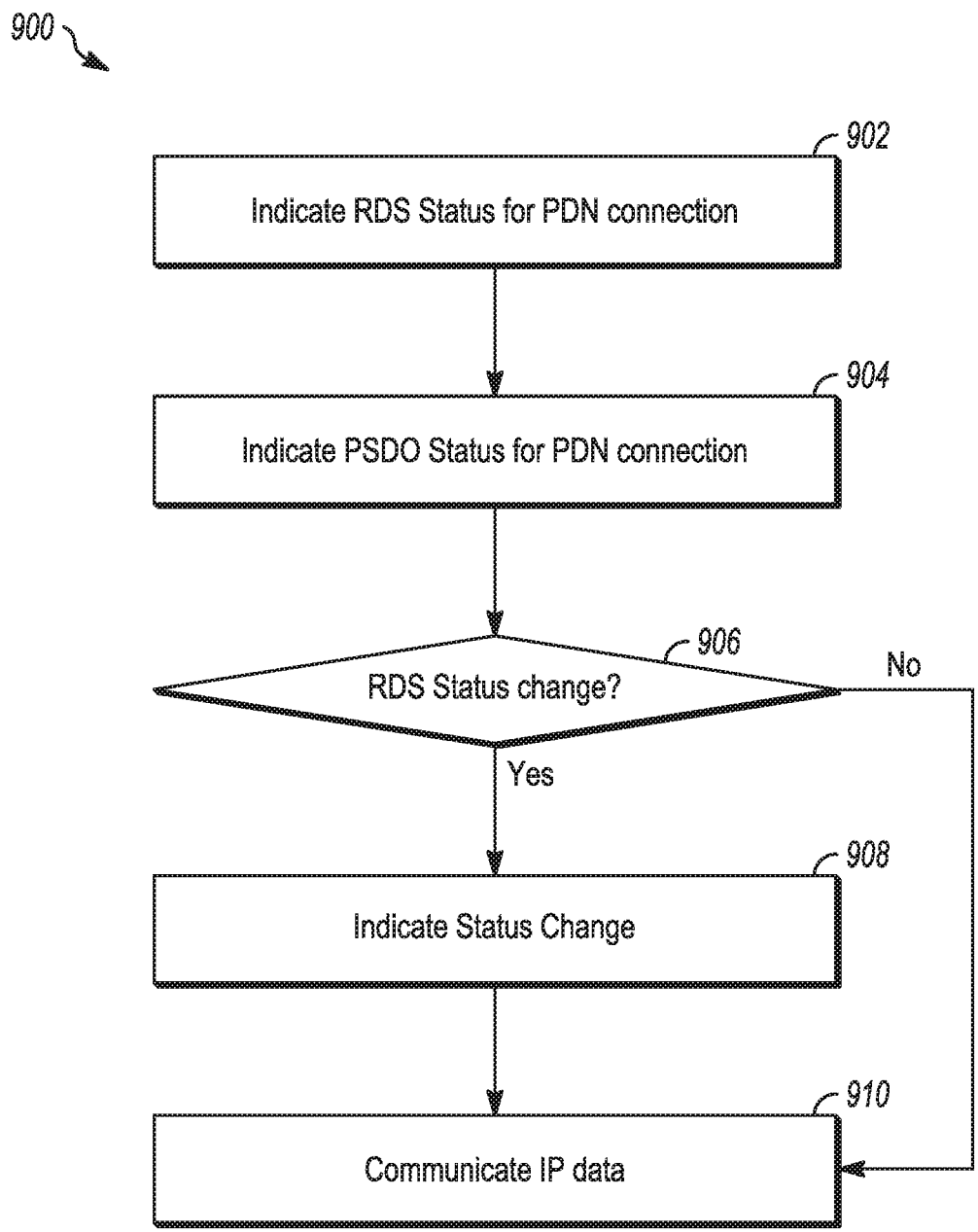
FIG. 9 illustrates a flowchart of communication in accordance with some embodiments.

FIG. 9 illustrates a flowchart of communication in accordance with some embodiments. The operations of the method 900 may be performed within the UE, by the TE and MT for example. Some operations may not be shown for convenience, such as the UE sending an attach request message as well as a PDN connectivity request message when initially attaching to the E-UTRAN. The TE may be capable of exchanging information with the MT by using AT Commands. The TE may exchange information about RDS with the MT at operation 902 by using an AT command. Specifically, the TE may indicate in the +CGDCONT AT command to the MT whether UE is using RDS for a PDN connection via the <Reliable_Data_Service> parameter. The decision as to whether to set up the PDN connection may have been made during activation of the PDN connection.

In some embodiments, the RDS status of the PDN connection may not change while the PDN connection is active. The RDS status may further change during PDN activation. In this case, a new AT command may be used to indicate the change.

The TE may also exchange information about the PSDO status with the MT at operation 904 by using the AT command. Specifically, the TE may indicate in the +CGD-CONT AT command to the MT whether UE is using PSDO via the <PS_Data_Off_Status> parameter. The PSDO status may be provided to the network by the MT during activation of the PDN connection. The PSDO status in some embodiments can be unknown or deactivated or activated.

The MT may indicate to the TE in the +CGDCONTRDP AT command whether RDS is being used for a particular PDN connection via the <Reliable_Data_Service> parameter. The support for RDS may be enabled via negotiation between UE and SCEF or P-GW by using a Protocol Configuration Option (PCO) parameter as specified in 3GPP TS 24.301 and 3GPP TS 24.008 subclause 10.5.6.3.

Similarly, the MT may indicate in the +CGDCONTRDP AT command to the TE via the <PS_Data_Off_Support> parameter whether UE and network support PSDO or not. The support for PSDO is enabled via negotiation between UE and a network entity such as a SCEF or P-GW by using the PCO parameter as specified in 3GPP TS 24.301 and 3GPP TS 24.008 subclause 10.5.6.3.

While the PDN connection is active, the PSDO Status may change. When this is determined at operation 906, the TE may update the PSDO status to the MT using the <PS_Data_Off_Status> parameter of the +CGPSDSTAT AT command, to the +CGDCONT AT command may, however, not be used. The PDP definition may not be allowed to be changed while the packet data protocol (PDP) is active. This status may be encoded (as all communications to and from the network) and forwarded to the network by the MT using a PDP modification procedure if the network has indicated support for PS Data Off in the PDP Activation response. As above, the PSDO status can be unknown or deactivated or activated. The network may decode and subsequently process messages from the UE (as well as encoding messages to the UE, which the UE may subsequently decode and process).

Alternatively, the TE may use the +CPSDO AT command to specify the PSDO status to the MT, and then to the network during the attach procedure, a UE-requested PDN connectivity procedure, or a UE-requested bearer modification procedure. The PSDO UE status may be activated or deactivated.

After the network establishes the PDN connection with the appropriate characteristics, UL and DL IP data may then be provided on the PDN connection between the UE and the network at operation 908. Whether the IP data is provided may depend on the status of the RDS and PSDO, as well as the application associated with the data.

EXAMPLES

Example 1 is an apparatus of a user equipment (UE), the apparatus comprising: processing circuitry configured with logical entities that include, a Terminal Equipment (TE), a Mobile Terminal (MT) and a Terminal Adaptor (TA), the TE arranged to communicate with the MT through the TA, the processing circuitry arranged to configure the logical entities to: provide Reliable Data Service (RDS) between the UE and a network endpoint of a packet data network (PDN) connection when configured to support RDS, and limit uplink transmission of Internet Protocol (IP) packets to services related to 3GPP Packet Services Data Off (PSDO) Exempt Services when configured to support PSDO for the PDN connection and PSDO is activated, wherein the TE is arranged to generate at least one Attention (AT) command for communication to the MT through the TA to indicate a RDS status and a PSDO status of the PDN connection at the UE; and wherein the MT is arranged to communicate with the network endpoint and to: indicate to the network endpoint, based on the at least one AT command, the RDS status and the PSDO status; and a memory configured to store the PSDO status.

In Example 2, the subject matter of Example 1 includes, wherein the MT is further arranged to: indicate the RDS status and PSDO status in an Attach Request.

In Example 3, the subject matter of Examples 1-2 includes, wherein the MT is further arranged to: indicate the RDS status and PSDO status in a UE-requested PDN connectivity procedure.

In Example 4, the subject matter of Examples 1-3 includes, wherein the MT is further arranged to: indicate the RDS status and PSDO status in a UE-requested bearer modification procedure.

In Example 5, the subject matter of Examples 1-4 includes, wherein: the at least one AT command indicates the RDS status for the PDN connection through a parameter, the <Reliable_Data_Service> parameter configured to indicate whether the RDS is enabled.

In Example 6, the subject matter of Examples 1-5 includes, wherein: the at least one AT command that indicates the PSDO status is to indicated through a parameter, the parameter configured to indicate whether the PSDO status is deactivated or activated.

In Example 7, the subject matter of Examples 1-6 includes, wherein: the MT is further arranged to negotiate with a Service Capability Exposure Function (SCEF) or PDN Gateway (P-GW) to enable support of the RDS via a Protocol Configuration Option (PCO) parameter.

In Example 8, the subject matter of Examples 1-7 includes, wherein the TE is further arranged to: determine a change in the PSDO status while the PDN connection is active, and indicate the change in the PSDO status to the MT using another AT command.

In Example 9, the subject matter of Example 8 includes, wherein the TE is further arranged to: indicate the change in the PSDO status to the MT in a +CGPSDSTAT AT command via a parameter, the parameter configured to indicate whether the PSDO status is deactivated or activated.

In Example 10, the subject matter of Examples 8-9 includes, wherein the TE is further arranged to: indicate the change in the PSDO status to the MT without use of the +CGDCONT AT command.

In Example 11, the subject matter of Examples 8-10 includes, wherein the MT is further arranged to: indicate the change in the PSDO status to a PDN Gateway (P-GW) via a packet data protocol (PDP) modification procedure when the P-GW has indicated support for PSDO in a PDP Activation response.

In Example 12, the subject matter of Examples 1-11 includes, wherein the TE is further arranged to: indicate the PSDO status to the MT in a +CPSDO AT command via a parameter, the parameter configured to indicate whether the PSDO status is deactivated or activated.

In Example 13, the subject matter of Examples 1-12 includes, wherein: the TE comprises an application processor and the MT comprises a baseband processor separate from the application processor.

In Example 14, the subject matter of Examples 1-13 includes, wherein one of: the at least one AT command that indicates the RDS status for the PDN connection comprises a +CGDCONT AT command and the RDS status at the UE is indicated by a parameter, or the MT is further arranged to indicate to the TE in a +CGDCONTRDP AT command via a parameter whether RDS is being used for the PDN connection by the network.

In Example 15, the subject matter of Examples 1-14 includes, wherein one of: the at least one AT command that indicates the PSDO status for the PDN connection comprises a +CGDCONT AT command and the PSDO status is indicated by a parameter, the parameter configured to indicate whether the PSDO status is deactivated or activated at the UE, or the MT is further arranged to indicate to the TE in a +CGDCONTRDP AT command via a parameter whether PSDO support is enabled for the PDN connection at the network.

In Example 16, the subject matter of Examples 1-15 includes, wherein the network endpoint is a mobility management entity (MME), Service Capability Exposure Function (SCEF) or PDN gateway (P-GW).

Example 17 is a computer-readable storage medium that stores instructions for execution by one or more processors that configure logical entities including a mobile equipment (ME), the ME configured to, when the instructions are executed: transmit, from Terminal Equipment (TE) of the UE to a Mobile Terminal (MT) of the UE, at least one Attention (AT) command to indicate a Reliable Data Service (RDS) status and a Packet Services Data Off (PSDO) status of a packet data network (PDN) connection at the ME; and indicate to a network entity of a network, based on the at least one AT command, the RDS status and PSDO status of the PDN connection in one of an Attach Request, a ME-requested PDN connection request, or a ME-requested bearer modification request.

In Example 18, the subject matter of Example 17 includes, wherein instructions, when executed, further configure the ME to: transmit, from the MT to the TE, a +CGDCONTRDP AT command, the +CGDCONTRDP AT command comprising a parameter that indicates whether RDS is being used for the PDN connection at the network.

In Example 19, the subject matter of Examples 17-18 includes, wherein instructions, when executed, further configure the ME to: transmit, from the MT to the TE, a +CGDCONTRDP AT command, the +CGDCONTRDP AT command comprising parameter that indicates whether PSDO support is enabled for the PDN connection at the network.

In Example 20, the subject matter of Examples 17-19 includes, wherein instructions, when executed, further configure the ME to: communicate, from the MT to a Service Capability Exposure Function (SCEF) or PDN gateway (P-GW), a Protocol Configuration Option (PCO) parameter to negotiate support of at least one of RDS or PSDO.

In Example 21, the subject matter of Examples 17-20 includes, wherein instructions, when executed, further configure the ME to: determine a change in the PSDO status while the PDN connection is active, indicate the change in the PSDO status from the TE to the MT via a parameter in a +CGPSDSTAT AT command, the parameter configured to indicate whether the PSDO status is deactivated or activated at the ME; and indicate the change in the PSDO status from the MT to a PDN gateway (P-GW) via a packet data protocol (PDP) modification procedure when the P-GW has indicated support for PSDO in a PDP Activation response.

In Example 22, the subject matter of Examples 17-21 includes, wherein instructions, when executed, further configure the ME to: indicate, from the TE to the MT, the PSDO status in a +CPSDO AT command via a parameter, the parameter configured to indicate whether the PSDO status is deactivated or activated at the ME.

In Example 23, the subject matter of Examples 17-22 includes, wherein: the at least one AT command comprises a +CGDCONT AT command, the RDS status at the ME is indicated by a parameter in the +CGDCONT AT command, and the PSDO status is indicated by a parameter in the +CGDCONT AT command, the parameter configured to indicate whether the PSDO status is deactivated or activated.

Example 24 is an apparatus of a network entity in a network, the apparatus comprising: processing circuitry arranged to: decode a request from a user equipment (UE), the request comprising one of an Attach Request, a UE-requested PDN connection request, or a UE-requested bearer modification request, the request indicating a Reliable Data Service (RDS) status and a Packet Services Data Off (PSDO) status of a packet data network (PDN) connection for the UE; and after establishment of the PDN connection based on the RDS and PSDO status, communicate data with the UE on the PDN connection that indicates the RDS and PSDO status at the network.

In Example 25, the subject matter of Example 24 includes, wherein the processing circuitry is further arranged to: indicate, to the UE, support for PSDO in a packet data protocol (PDP) Activation response to the UE; and decode, from the UE, an indication of a change in the PSDO status while the PDN connection is active via a PDP modification procedure after transmission of the PDP Activation response to the UE.

Example 26 is an apparatus, comprising: means for transmitting, from Terminal Equipment (TE) of the UE to a Mobile Terminal (MT) of the UE, at least one Attention (AT) command to indicate a Reliable Data Service (RDS) status and a Packet Services Data Off (PSDO) status of a packet data network (PDN) connection at the ME; and means for indicating to a network entity of a network, based on the at least one AT command, the RDS status and PSDO status of the PDN connection in one of an Attach Request, a ME-requested PDN connection request, or a ME-requested bearer modification request.

In Example 27, the subject matter of Example 26 includes, means for transmitting, from the MT to the TE, a +CGDCONTRDP AT command, the +CGDCONTRDP AT command comprising a parameter that indicates whether RDS is being used for the PDN connection at the network.

In Example 28, the subject matter of Examples 26-27 includes, means for transmitting, from the MT to the TE, a +CGDCONTRDP AT command, the +CGDCONTRDP AT command comprising parameter that indicates whether PSDO support is enabled for the PDN connection at the network.

In Example 29, the subject matter of Examples 26-28 includes, means for communicating, from the MT to a Service Capability Exposure Function (SCEF) or PDN gateway (P-GW), a Protocol Configuration Option (PCO) parameter to negotiate support of at least one of RDS or PSDO.

In Example 30, the subject matter of Examples 26-29 includes, means for determining a change in the PSDO status while the PDN connection is active: means for indicating the change in the PSDO status from the TE to the MT via a parameter in a +CGPSDSTAT AT command, the parameter configured to indicate whether the PSDO status is deactivated or activated at the ME: and means for indicating the change in the PSDO status from the MT to a PDN gateway (P-GW) via a packet data protocol (PDP) modification procedure when the P-GW has indicated support for PSDO in a PDP Activation response.

In Example 31, the subject matter of Examples 26-30 includes, means for indicating, from the TE to the MT, the PSDO status in a +CPSDO AT command via a parameter, the parameter configured to indicate whether the PSDO status is deactivated or activated at the ME.

In Example 32, the subject matter of Examples 26-31 includes, wherein: the at least one AT command comprises a +CGDCONT AT command, the RDS status at the ME is indicated by a parameter in the +CGDCONT AT command, and the PSDO status is indicated by a parameter in the +CGDCONT AT command, the parameter configured to indicate whether the PSDO status is deactivated or activated.

Example 33 is an apparatus for Terminal Equipment (TE) configured to communicate with a Mobile Termination (MT) via a Terminal Adapter (TA), the apparatus comprising: processing circuitry arranged to generate at least one Attention (AT) command to indicate a Reliable Data Service (RDS) status and a Packet Services Data Off (PSDO) status of a packet data network (PDN) connection with a network endpoint: communicate the AT command to the MT through the TA; and limit, when configured to support PSDO for the PDN connection and PSDO is activated, uplink transmission of Internet Protocol (IP) packets to the MT, the IP packets limited to services related to PSDO Exempt Services; and a memory configured to store the PSDO status.

In Example 34, the subject matter of Example 33 includes, wherein: the at least one AT command indicates the RDS status for the PDN connection through a parameter, the <Reliable_Data_Service> parameter configured to indicate whether the RDS is enabled.

In Example 35, the subject matter of Examples 33-34 includes, wherein: the at least one AT command that indicates the PSDO status is indicated through a parameter, the parameter configured to indicate whether the PSDO status is deactivated or activated.

In Example 36, the subject matter of Examples 33-35 includes, wherein the TE is further arranged to: determine a change in the PSDO status while the PDN connection is active, and indicate the change in the PSDO status to the MT using another AT command.

In Example 37, the subject matter of Example 36 includes, wherein the TE is further arranged to: indicate the change in the PSDO status to the MT in a +CGPSDSTAT AT command via a parameter, the parameter configured to indicate whether the PSDO status is deactivated or activated.

In Example 38, the subject matter of Examples 36-37 includes, wherein the TE is further arranged to: indicate the change in the PSDO status to the MT without use of the +CGDCONT AT command.

In Example 39, the subject matter of Examples 33-38 includes, wherein the TE is further arranged to: indicate the PSDO status to the MT in a +CPSDO AT command via a parameter, the parameter configured to indicate whether the PSDO status is deactivated or activated.

In Example 40, the subject matter of Examples 33-39 includes, wherein at least one of: the at least one AT command that indicates the RDS status for the PDN connection comprises a +CGDCONT AT command and the RDS status is indicated by a parameter, or the TE is further arranged to receive from the MT a +CGDCONTRDP AT command via a parameter that indicates whether RDS is being used for the PDN connection by the network.

In Example 41, the subject matter of Examples 33-40 includes, wherein at least one of: the at least one AT command that indicates the PSDO status for the PDN connection comprises a +CGDCONT AT command and the PSDO status is indicated by a parameter, the parameter configured to indicate whether the PSDO status is deactivated or activated, or the TE is further arranged to receive from the MT a +CGDCONTRDP AT command via a parameter whether PSDO support is enabled for the PDN connection at the network.

Example 42 is at least one machine-readable medium including instructions that, when executed by processing circuitry, cause the processing circuitry to perform operations to implement of any of Examples 1-41.

Example 43 is an apparatus comprising means to implement of any of Examples 1-41.

Example 44 is a system to implement of any of Examples 1-41.

Example 45 is a method to implement of any of Examples 1-41.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a user equipment (UE), the apparatus comprising:
   processing circuitry configured with logical entities that include a Terminal Equipment (TE), a Mobile Terminal (MT) and a Terminal Adaptor (TA), the TE arranged to communicate with the MT through the TA, the processing circuitry arranged to configure the logical entities to:
   provide Reliable Data Service (RDS) between the UE and a network endpoint of a packet data network (PDN) connection when configured to support RDS, and
   limit uplink transmission of internet Protocol (IP) packets to services related to 3GPP Packet Services Data Off (PSDO) Exempt Services when configured to support PSDO for the PDN connection and PSDO is activated, wherein the TE is arranged to generate at least one Attention (AT) command for communication to the MT through the TA to indicate a RDS status and a PSDO status of the PDN connection at the UE; and wherein the MT is arranged to communicate with the network endpoint and to:

indicate to the network endpoint, based on the at least one AT command, the RDS status and the PSDO status; and a memory configured to store the PSDO status.

2. The apparatus of claim 1, wherein the MT is further arranged to:

indicate the RDS status and PSDO status in an Attach Request.

3. The apparatus of claim 1, wherein the MT is further arranged to:

indicate the RDS status and PSDO status in a UE-requested PDN connectivity procedure.

4. The apparatus of claim 1, wherein the MT is further arranged to:

indicate the RDS status and PSDO status in a UE requested bearer modification procedure.

5. The apparatus of claim 1, wherein:

the at least one AT command indicates the RDS status for the PDN connection through a <Reliable_Data_Service> parameter, the <Reliable_Data_Service> parameter configured to indicate whether the RDS is enabled.

6. The apparatus of claim 1, wherein:

the at least one AT command that indicates the PSDO status is indicated through a <PS_Data_Off_Status> parameter, the <PS_Data_Off_Status> parameter configured to indicate whether the PSDO status is deactivated or activated.

7. The apparatus of claim 1, wherein:

the MT is further arranged to negotiate with a Service Capability Exposure Function (SCEF) or PDN Gateway (P-GW) to enable support of the RDS via a Protocol Configuration Option (PCO) parameter.

8. The apparatus of claim 1, wherein the TE is further arranged to:

determine a change in the PSDO status while the PDN connection is active, and indicate the change in the PSDO status to the MT using another AT command.

9. The apparatus of claim 8, wherein the TE is farther arranged to:

indicate the change in the PSDO status to the MT in a +CGPSDSTAT AT command via a <PS_Data_Off_Status> parameter, the <PS_Data_Off_Status> parameter configured to indicate whether the PSDO status is deactivated or activated.

10. The apparatus of claim 8, wherein the TE is further arranged to:

indicate the change in the PSDO status to the MT without use of a +CGDCONT AT command.

11. The apparatus of claim 8, wherein the MT is further arranged to:

indicate the change in the PSDO status to a PDN Gateway (P-GW) via a packet data protocol (PDP) modification procedure when the P-GW has indicated support for PSDO in a PDP Activation response.

12. The apparatus of claim 1, wherein the TE is further arranged to:

indicate the PSDO status to the MT in a +CPSDO AT command via a <PS_Data_Off_Status> parameter, the <PS_Data_Off_Status> parameter configured to indicate whether the PSDO status is deactivated or activated.

13. The apparatus of claim 1, wherein:

the TE comprises an application processor and the MT comprises a baseband processor separate from the application processor.

14. The apparatus of claim 1, wherein one of:

the at least one AT command that indicates the RDS status for the PDN connection comprises a +CGDCONT AT command and the RDS status at the RDS is indicated by a <Reliable_Data_Service> parameter, or the MT is further arranged to indicate to the TE in a +CGDCONTRDP AT command via a <Reliable_Data_Service> parameter whether RDS is being used for the PDN connection by the network.

15. The apparatus of claim 1, wherein one of:

the at least one AT command that indicates the PSDO status for the PDN connection comprises a +CGDCONT AT command and the PSDO status is indicated by a <PS_Data_Off_Status> parameter, the <PS_Data_Off_Status> parameter configured to indicate whether the PSDO status is deactivated or activated at the LE, or the MT is further arranged to indicate to the TE in a +CGDCONTRDP AT command via a <PS_Data_Off_Support> parameter whether PSDO support is enabled for the PDN connection at the network.

16. The apparatus of claim 1, wherein the network endpoint is a mobility management entity (MME), Service Capability Exposure Function (SCEF) or PDN gateway (P-GW).

17. A non-transitory computer-readable storage medium that stores instructions for execution by one or more processors that configure logical entities including a mobile equipment (MME), the ME configured to, when the instructions are executed:

transmit, from Terminal Equipment (TE) of the ME to a Mobile Terminal (MT) of the ME, at least one Attention (AT) command to indicate a Reliable Data Service (RDS) status and a Packet Services Data Off (PSDO) status of a packet data network (PDN) connection at the ME; and indicate to a network entity of a network, based on the at least one AT command, the RDS status and PSDO status of the PDN connection in one of an Attach Request, a ME-requested PDN connection request, or a ME-requested bearer modification request.

18. The medium of claim 17, wherein instructions, when executed, further configure the MF to at least one of:

transmit, from the MT to the TE, a +CGDCONTRDP AT command, the +CGDCONTRDP AT command comprising a <Reliable_Data_Service> parameter that indicates whether RDS is being used for the PDN connection at the network, transmit, from the MT to the TE, a +CGDCONTRDP AT command, the +CGDCONTRDP AT command comprising <PS_Data_Off_Support> parameter that indicates whether PSDO support is enabled for the PDN connection at the network, indicate, from the TE to the MT, the PSDO status in a ±CPSDO AT command via a <PS_Data_Off_Status> parameter, the <PS_Data_Off_Status> parameter configured to indicate whether the PSDO status is deactivated or activated at the MF, or determine a change in the PSDO status while the PDN connection is active, indicate the change in the PSDO status from the TE to the MT via a <PS_Data_Off_Status> parameter in a +CGPSDSTAT AT command, the <PS_Data_Off_Status> parameter configured to indicate whether the PSDO status is deactivated or activated at the ME, and indicate the change in the PSDO status from the MT to a PDN gateway (P-GW) via a packet data protocol (PDP) modification procedure when the P-GW has indicated support for PSDO in a PDP Activation response.

19. An apparatus of a user equipment (UE), the apparatus comprising:
  processing circuitry configured with logical entities that include a Terminal Equipment (TE), a Mobile Terminal (MT) and a Terminal Adaptor (TA), the TE arranged to communicate with the MT through the TA, the processing circuitry arranged to configure the logical entities to:
    use a parameter <Reliable_Data_Service> in a +CGDCONT Attention (AT) command and a +CGDSCONT AT command for the TE to respectively query or set applicability of Reliable Data Service (RDS) for a packet data network (PDN) connection, and
    use a parameter <PS_Data_Off_Status> in a +CPSDO AT command to indicate during PDN activation a Packet Services Data Off (PSDO) status to a network from the MT; and
  a memory configured to store the PSDO status.

20. The apparatus of claim 19, wherein the processing circuitry is arranged to further configure the logical entities to:
  determine whether the network supports PSDO, and
  use a parameter <PS_Data_Off_Support> in a +CGCONTRDP AT command to indicate network support for PSDO to the TE from the MT.

* * * * *

UNITED STATES PATENT AND TRADEMARK OFFICE
CERTIFICATE OF CORRECTION

PATENT NO. : 11,259,342 B2
APPLICATION NO. : 16/645403
DATED : February 22, 2022
INVENTOR(S) : Vivek G. Gupta It is certified that error appears in the above-identified patent and that said Letters Patent is hereby corrected as shown below:

In the Claims

In Column 37, Line 49, in Claim 9, delete "farther" and insert --further-- therefor In Column 38, Line 13, in Claim 14, delete "RDS is" and insert --UE is-- therefor In Column 38, Line 14, in Claim 14, after "or", insert a linebreak In Column 38, Line 26, in Claim 15, delete "LE," and insert --UE,-- therefor In Column 38, Line 38, in Claim 17, delete "(MME)," and insert --(ME),-- therefor In Column 38, Line 52, in Claim 18, delete "MF" and insert --ME-- therefor In Column 38, Line 64, in Claim 18, delete "±CPSDO" and insert --+CPSDO-- therefor In Column 38, Line 67, in Claim 18, delete "MF," and insert --ME,-- therefor Signed and Sealed this
Tenth Day of May, 2022

Katherine Kelly Vidal
*Director of the United States Patent and Trademark Office*